United States Patent

Ward

Patent Number: 6,006,092
Date of Patent: Dec. 21, 1999

[54] QUALITY DRIVEN VOICE CHANNEL SELECTION IN A CELLULAR TELEPHONE SYSTEM USING IDLE VOICE CHANNEL SIGNAL STRENGTH MEASUREMENTS

[75] Inventor: Torbjorn Ward, Montreal, Canada

[73] Assignee: Telefonaktiebolaget LM Ericsson, Stockholm, Sweden

[21] Appl. No.: 08/603,858

[22] Filed: Feb. 22, 1996

[51] Int. Cl.[6] .............................. H04Q 7/20; H04Q 7/34
[52] U.S. Cl. ...................... 455/438; 455/436; 455/439; 455/450; 455/421
[58] Field of Search ............................ 455/438, 436, 455/439, 450, 464, 553, 67.1, 447, 511, 422, 524, 437, 516, 423

[56] References Cited

U.S. PATENT DOCUMENTS

| | | |
|---|---|---|
| 4,608,711 | 8/1986 | Goldman . |
| 4,670,899 | 6/1987 | Brody et al. . |
| 4,726,050 | 2/1988 | Menich et al. ........................ 455/438 |
| 5,042,082 | 8/1991 | Dahlin ................................. 455/436 |
| 5,093,924 | 3/1992 | Toshiyuki .............................. 455/33 |
| 5,119,397 | 6/1992 | Dahlin et al. ....................... 455/553 |
| 5,148,548 | 9/1992 | Meche et al. . |
| 5,175,867 | 12/1992 | Wejke et al. ........................ 455/438 |
| 5,239,676 | 8/1993 | Strawczynski et al. . |
| 5,239,682 | 8/1993 | Strawcynski et al. . |
| 5,260,943 | 11/1993 | Comroe et al. . |
| 5,276,908 | 1/1994 | Koohgoli et al. . |
| 5,345,597 | 9/1994 | Strawczynski et al. . |
| 5,375,123 | 12/1994 | Anderson et al. ................... 455/452 |
| 5,491,837 | 2/1996 | Haartsen ............................ 455/450 |
| 5,572,510 | 11/1996 | Koivu ................................ 455/67.1 |
| 5,574,775 | 11/1996 | Miller, II et al. .................... 455/438 |
| 5,594,949 | 1/1997 | Anderson et al. ................... 455/437 |
| 5,634,192 | 5/1997 | Meche et al. ....................... 455/437 |

FOREIGN PATENT DOCUMENTS

| | | | |
|---|---|---|---|
| 0504122 | 9/1992 | European Pat. Off. ......... | H04Q 7/04 |
| WO 9604760 | 2/1996 | WIPO ............................. | H04Q 7/34 |

*Primary Examiner*—Wellington Chin
*Assistant Examiner*—Keith Ferguson
*Attorney, Agent, or Firm*—Jenkens & Gilchrist

[57] ABSTRACT

Each base station in a cellular telephone system includes a signal strength measurement device operable to tune to and make signal strength measurements on not only the voice channels assigned to other cells, but also on its own voice channels. The measurements on the own voice channels provide an indication of injected interference useful in making quality driven voice channel assignments during either call set-up or hand-off. In a conventional analog cellular system, the signal strength measurement device comprises the base station signal strength receiver measuring on own idle base station analog voice frequencies. In a time division multiple access (TDMA) cellular system, the signal strength measurement device comprises the base station location verification module measuring during idle time slots on digital voice frequencies.

25 Claims, 3 Drawing Sheets

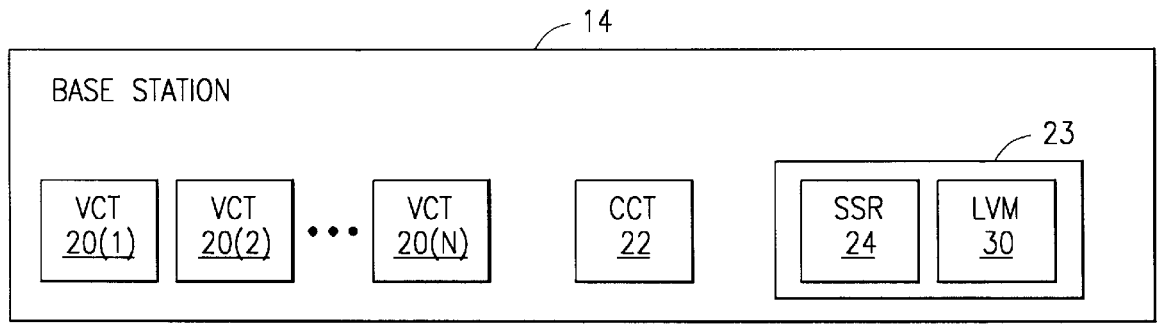
FIG. 2
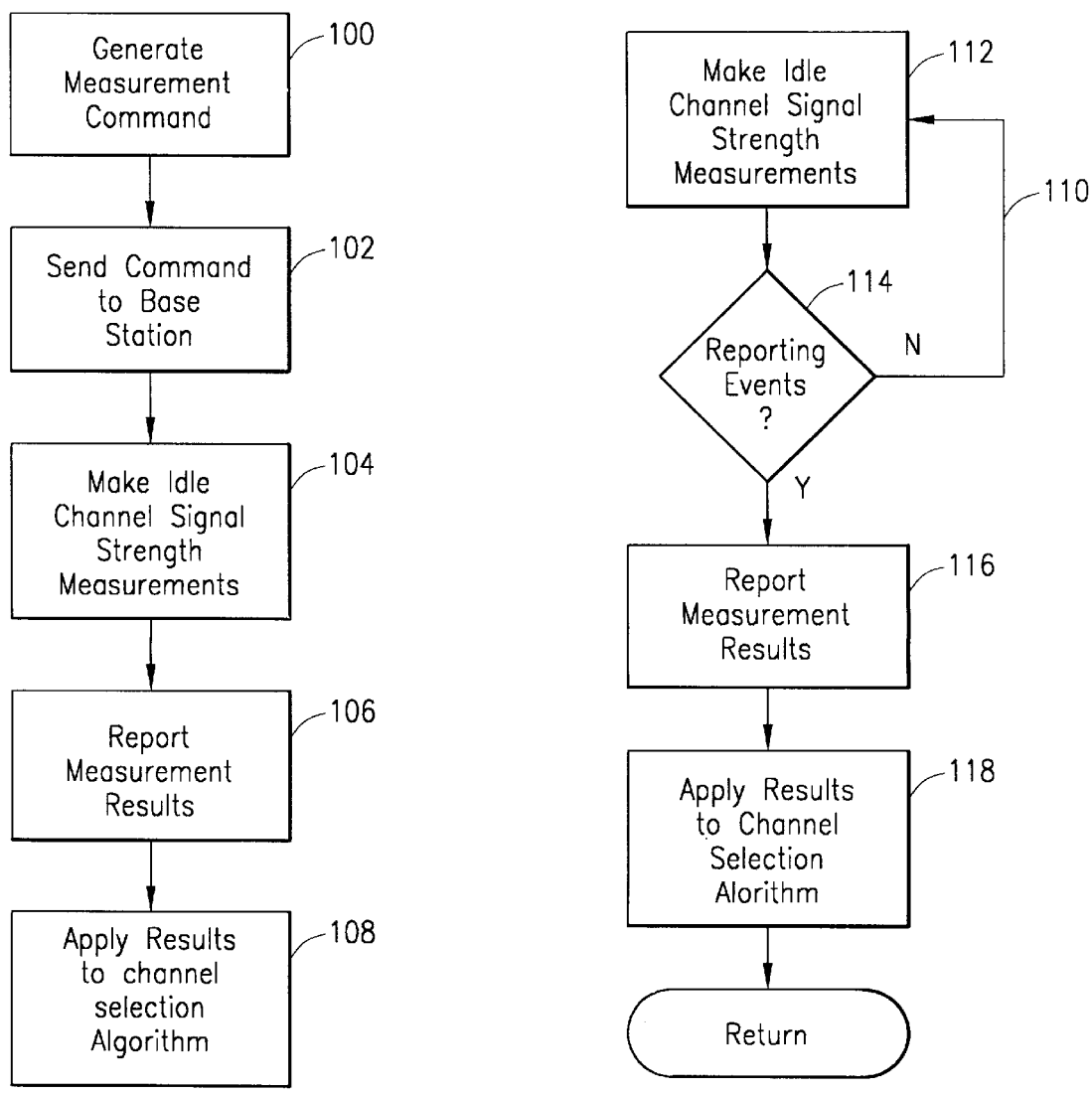
FIG. 3A
FIG. 3B

QUALITY DRIVEN VOICE CHANNEL SELECTION IN A CELLULAR TELEPHONE SYSTEM USING IDLE VOICE CHANNEL SIGNAL STRENGTH MEASUREMENTS

BACKGROUND OF THE INVENTION

1. Technical Field of the Invention

The present invention relates to cellular telephone systems and, in particular, to a method and apparatus for effectuating quality driven voice channel selection during call set-up and hand-off in response to signal strength measurements made on idle voice channels.

2. Description of Related Art

Cellular telephone systems divide a large service area into a number of smaller discrete geographical areas called "cells" each typically ranging in size from about one-half to about twenty kilometers in diameter. Each cell is contiguous with multiple adjacent cells to provide continuous coverage throughout the service area. A base station including a plurality of transceivers capable of operating independently on different radio frequency channels is provided for each of the cells. Via the transceivers, the base stations engage in simultaneous communications with plural mobile stations operating within the area of the associated cell. The base stations further communicate via data links (and voice trunks) with a central control station, commonly referred to as a mobile switching center, which functions to selectively connect telephone calls to the mobile stations through the base stations and, in general, control operation of the system.

Each cell is assigned to use a predetermined set of voice frequencies. The availability of multiple voice frequencies per cell permits base stations to simultaneously handle many telephone conversations with many mobile stations. The voice frequencies assigned to a cell are preferably spaced apart across the frequency spectrum of the cellular band. This serves to minimize the instances of adjacent channel interference.

Because only a limited number of voice frequencies are available in the cellular band, the same voice frequencies are repeated (i.e., reused) in other cells in a distant part of large service areas with many cells. No adjacent cells, however, are assigned the same voice frequency. Furthermore, the power levels of the signal transmissions on any given voice frequency are limited in strength. The foregoing precautions serve to minimize the likelihood of co-channel interference caused by reuse of that same voice frequency in a distant cell.

In spite of the precautions taken by service providers, it is known that instances of adjacent channel and co-channel interference do occur. This interference often adversely affects system operation by, for example, degrading voice quality on the voice channels or interfering with the transmission and reception of control signals on the control channels.

The mobile switching center functions to dynamically allocate analog voice channels (comprising the assigned voice frequencies) and digital voice channels (comprising time slots in assigned digital time division multiple access (TDMA) voice frequencies) available in any one cell among the plurality of mobile stations located within the cell area that desire communications. Commands that allocate for mobile station use a certain analog or digital voice channel assigned to a given cell are transmitted from the mobile switching center to the base station for that cell. The commands are then relayed by the base station to the certain mobile station over a control channel to direct mobile station selection of the allocated voice channel for handling the call.

Allocation by the mobile switching center of a particular analog or digital voice channel in a cell to a particular mobile station for a cellular communication (i.e., a call) primarily occurs in two instances. The first instance is at call set-up when the subscriber activates the mobile station to initiate a call and the system selects the voice channel to carry that new call. The second instance is at call hand-off when the subscriber, while engaged in a call, moves from one cell in the service area to another cell, and the system selects the voice channel in the new cell that will handle the on-going call. In either case, it is important that the voice channel selected at call set-up or hand-off be of the highest quality possible.

Conventionally, the selection by the system of a voice channel in a cellular telephone system to carry a call is performed by randomly choosing a channel from the available (idle) analog or digital voice channels in a cell. Alternatively, the system maintains a record of voice channel use for each cell (normally in the form of a FIFO queue), and the voice channel selected to carry the call is the channel in the cell that has not been allocated for calling use in the longest period of time. While each of these selection methods is successful in allocating a voice channel in a cell to a mobile station for carrying the call, the selection fails to take into consideration whether the selected voice channel is the best quality (i.e., least interfered) channel available to carry the call. Thus, in many instances there may be significant interference (often comprising adjacent channel or perhaps more frequently co-channel interference) on the randomly or queue selected voice channel, and another one of the available idle voice channels in the cell would have been a more appropriate selection for use in carrying the call.

There is accordingly a need for a method and apparatus for evaluating available idle voice channel quality in a cellular telephone system prior to selecting one of those voice channels to carry a call in response to either a call set-up or hand-off situation. Such a method and apparatus should preferably be implemented without requiring alterations to existing cellular telephone system hardware, and should operate in both the conventional analog and TDMA digital environments to evaluate the quality of analog and digital voice channels, respectively.

SUMMARY OF THE INVENTION

The base station in each cell of a cellular telephone system includes a signal strength measurement device used by the system to make measurements that assist the system in making the hand-off determination. When a hand-off situation is encountered, the mobile switching center instructs the base stations to use their signal strength measurement devices to measure the signal strength of cellular communications occurring on the analog or digital voice channels currently being used by mobile stations in other cells. In this connection, the term "voice channels" includes both analog voice frequencies and digital TDMA time slots within a particular voice frequency. These measurements are reported back to the system where a determination is made, based in part on the received signal strengths, as to which of the cells is the best candidate (or target) cell for hand-off of these mobile station calls.

The signal strength measurement device in each base station is tunable to any of the voice channels assigned for use in the cellular band, including those voice channels assigned for use as voice channels in its own cell. Signal strength measurements are then additionally made by the signal strength measurement device in accordance with the present invention on each idle voice channel assigned to that cell. From these measurements, the injected interference (comprising either adjacent channel, co-channel, or other type of interference) on each of the idle voice channels is determined and reported to the mobile switching center. The reported measurements are subsequently used by the system in making, for a base station, a quality driven voice channel selection during either call set-up or hand-off from the voice channels assigned to that base station.

The invention is applicable to both a conventional analog cellular telephone system, as well as in a digital TDMA cellular telephone system. In the conventional analog system, the signal strength measurement device comprises the analog signal strength receiver of the base station. In the TDMA digital system, the signal strength measurement device comprises the digital locating verification module of the base station, and the signal strength measurements are made with respect to each idle time slot in the voice frequencies assigned to that base station. In either case, the present invention advantageously utilizes existing analog/digital base station hardware controlled to perform additional tasks, thus obviating the need to retrofit or replace existing cellular equipment (hardware) in implementing the present invention and providing quality driven voice channel selection.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 is a simplified block diagram of an analog/digital base station in accordance with the present invention for use in the frequency reuse cellular telephone system of FIG. 1;

FIGS. 3A and 3B are flow diagrams illustrating alternative methods of operation in accordance with the present invention.

DETAILED DESCRIPTION OF EMBODIMENTS

There are a plurality of radio frequency channels in the cellular band available to cellular telephone system providers for use in communicating with mobile stations. A majority of the available radio frequency channels are reserved as voice frequencies for carrying analog and/or digital telephone calls. The remaining radio frequency channels are reserved as control frequencies for carrying the control signals (commands) used to direct operation of the system. Such control signals include page signals, page response signals, location registration signals, voice channel assignments, maintenance instructions, and cell selection or reselection instructions. In an analog cellular system, there is one analog voice channel per voice frequency. In a digital TDMA cellular system, however, there are a plurality of digital voice channels per voice frequency.

A common cellular system structure authorized by the Federal Communications Commission for operation in the United Stated provides three-hundred thirty-three radio frequency channels, plus add-ons where applicable, for use in the cellular band. Of those available radio frequency channels, twenty-one of the channels comprise control frequencies which are typically utilized by the system on an at least one control frequency per cell basis to carry cellular system operation control signals and messages between mobile stations and base stations. The remaining three-hundred twelve radio frequency channels comprise voice frequencies which are typically divided more or less equally amongst the cells and allocated on as needed basis by the system to subscribers for carrying cellular voice communications between mobile stations and base stations. Thus, in a cellular system having a total of fifteen cells, there would be twenty voice frequencies available in each cell for subscriber use along with the at least one control frequency per cell.

A cellular service area can cover a large geographic area, and in many instances there will be a need for a large number of cells that often exceeds in number the number of cells provided by dividing the available radio frequency channels in such a manner as to handle expected subscriber usage. Accordingly, in order to provide sufficient call handling capacity throughout the service area, the cells are grouped into clusters of cells and the assigned radio frequency channels in the cellular band are reused in each of the clusters.

Figure 1:
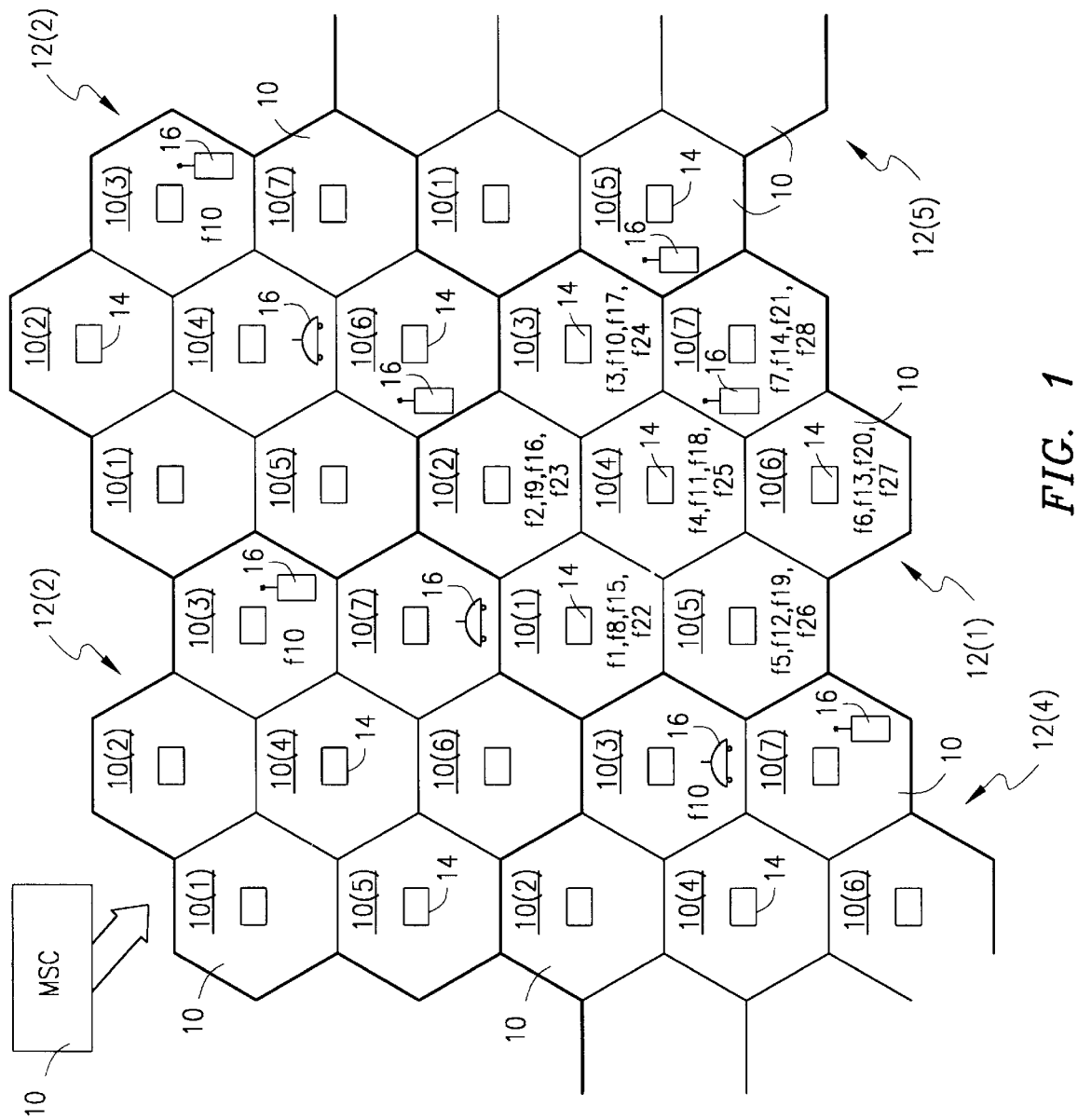
FIG. 1 is an exemplary cell diagram schematically illustrating a frequency reuse cellular telephone system wherein the present invention is implemented.

Reference is now made to FIG. 1 for an illustration of the radio frequency channel reuse concept commonly utilized in cellular systems. An arbitrary geographic area (hereinafter "the service area") is divided into a plurality of contiguous cells 10 schematically represented by hexagrams. The cells are then grouped into clusters 12 (outlined in bold to ease recognition), which in the present example comprise seven cells 10(1)–10(7) each. Assume for this example that there are a total of twenty-eight radio frequency channels fn (wherein n=1 to 28) available in the cellular band. It will of course be understood that each radio frequency actually comprises a paired uplink and downlink frequency. The first seven of the channels f1–f7 are reserved as control frequencies, and assigned one control frequency per cell to cells 10(1)–10(7), respectively, in each of the clusters 12. Thus, the first radio frequency f1 is assigned to each cell 10(1), frequency f2 to cell 10(2), and so on up to cell 10(7). The remaining radio frequency channels f8–f28 are reserved as voice frequencies, and are divided equally amongst the cells 10(1)–10(7) to provide three voice frequencies per cell. Thus, each of the cells 10(1), in addition to being assigned radio frequency f1 as the control frequency for its control channel, will have frequencies f8, f15 and f22 as the voice frequencies for carrying its voice channels (either analog or TDMA digital). Similar assignments are made for each of the remaining cells 10, with the voice frequencies also being reused across each of the included clusters 12. The complete assignment of the radio frequencies f1–f28 to the cells 10(1)–10(7) in each cluster 12 in accordance with this example of cellular frequency reuse is illustrated in detail in FIG. 1 with respect to cluster 12(1).

It will be noted in this frequency reuse scheme that in no instance have adjacent cells been assigned use of the same radio frequency. Reuse of an identical radio frequency in the service area at a minimum requires a separation of at least one cell 10 along with a regulation of broadcast power from each cell to constrain radio propagation substantially within the cell area. Furthermore, it will be noted that in no instance does any one cell 10 utilize adjacent radio frequencies in the cellular band. Adjacent radio frequencies should exist no closer than one cell 10 away each other. By arranging the cells 10 in clusters 12 as shown in the figure, regulating broadcast power of communications within the cell, and further by assigning frequencies in the fashion described above and shown in the figure, the likelihood of interference is minimized while simultaneously providing effective and efficient cellular communications services across a very large service area.

In spite of the precautions taken to avoid interference, it is known that interference does occur in cellular systems like that previously described. One aspect of this interference originates from same radio frequency channel communications occurring in the cells of other clusters 12 (i.e., co-channel interference). To understand this phenomena, assume the existence of concurrent voice communications on voice frequency f10 in each of the cells 10(3) in of each of the clusters 12(2), 12(3) and 12(4) as shown in FIG. 1. In spite of any imposed broadcast power limitations, a certain amount of the radio frequency energy of those voice communications propagates beyond the respective cell boundaries and is injected as interference into voice frequency f10 in cell 10(3) of cluster 12(1). This problem also occurs in digital TDMA systems where the interference is with respect to simultaneous communications during the same time slot on the same voice frequency.

Another aspect of this injected interference originates from adjacent radio frequency channel communications occurring in other cells (i.e., adjacent channel interference). To understand this phenomena, assume the existence of concurrent voice communications on voice frequency f8 in cell 10(1) and voice frequency f9 in cell 10(2) of cluster 12(1) as shown in FIG. 1. In spite of any regulations on broadcast power and the presence of guard bands around each of the radio frequency channels, improper transceiver broadcasts around one voice frequency (for example, f8) may be injected as interference into the adjacent voice frequency f9. This problem also occurs in digital TDMA systems with respect to concurrent time slot broadcasts on adjacent voice frequencies. It should be recognized that adjacent channel interference is not nearly as common an occurrence as co-channel interference in well regulated and stable communication systems.

Because this injected interference may adversely affect cellular voice communications on a given voice frequency, it would be unwise for the system at certain times of high interference to be allocated that given voice frequency at either call set-up or hand-off to carry a cellular voice communication. Unfortunately, the prior art random or queued voice channel selection methods fail to consider such injected interference and its adverse effects in selecting and assigning a voice channel (analog voice frequency or digital TDMA time slot) during either call set-up or hand-off. There would be a great advantage to system operation if voice channel quality measurements would be made and evaluated prior to system voice channel selection.

Each of the cells 10 in a cellular system such as that illustrated in FIG. 1 includes at least one base station (BS) 14 configured to facilitate radio frequency communications with mobile stations 16 roaming throughout the service area. The base stations 14 are illustrated as being positionally located at or near the center of each of the cells 10. However, depending on geography and other known factors, the base stations 14 may instead be located at or near the periphery of, or otherwise away from the centers of, each of the cells 10. In such instances, the base stations 14 may broadcast and communicate with mobile stations 16 located within the cells 10 using directional rather than omni-directional antennas. The base stations 14 are connected by communications links (not shown) to at least one mobile switching center (MSC) 18 operating to control the operation of the system for providing cellular communications with the mobile stations 16.

Reference is now additionally made to FIG. 2 wherein there is shown is a simplified block diagram of a base station 14 used in the system of FIG. 1 in accordance with the present invention. The base station 14 includes a plurality of voice channel transceivers (VCT) 20(1) through 20(N), wherein N is the number of voice frequencies assigned to the cell 10 served by the base station. In the exemplary system shown in FIG. 1, N=3 wherein seven cells 10 are included in each cluster 12 and a total of twenty-eight available radio frequencies in the cellular band. The voice channel transceivers 20 have a configuration known in the art that includes a transmitter and a receiver tuned to operate on one of the voice frequencies assigned to the base station 14 for its voice channels. Each assigned voice frequency provides an analog voice channel and/or a plurality of digital TDMA voice channels for mobile station use.

The base station 14 further includes at least one control channel transceiver (CCT) 22. In the exemplary system shown in FIG. 1, each cell 10 includes a single control channel transceiver 22 for a system having seven cells 10 per cluster 12 and a total of twenty-eight available radio frequencies in the cellular band. The control channel transceiver 22 includes a transmitter and a receiver configured in a manner well known in the art, and tuned to operate on the control frequency assigned to the base station 14 for its control channel.

The base station 14 also includes a signal strength measurement device 23 that is used in one mode known in the art during hand-off to measure the signal strength of communications on the voice frequencies assigned to and used by other cells. Thus, for example, consider the situation in FIG. 1 wherein a mobile station 16 is located in cell 10(3) and is communicating with the base station 14 in cell 10(3) over a voice channel on voice frequency f10. As the mobile station 16 moves towards the fringes of cell 10(3), either the base station 14 in that cell, or the mobile station itself in MAHO systems, reports a decrease in received signal strength on the voice channel and requests the initiation of a hand-off to a new cell. In response, the mobile switching center 18 asks the base stations 14 in the cells 10 that neighbor cell 10(3) to make measurements on the current voice channel communication carried by voice frequency f10 using their signal strength measurement devices 23. The base stations 14 in the neighboring cells 10 then tune their signal strength measurement devices 23 to the voice channel and make a signal strength measurement. The results of such measurements are reported to the system and processed in order to select a target cell for hand-off.

As further explanation of the conventional hand-off process, one of the neighboring cells 10 is then selected, in part from the results of the signal strength measurements, as the target cell for hand-off. The mobile switching center 18 then instructs the base station 14 in the target cell to select a voice channel assigned to that base station for carrying the call. Alternatively, the mobile switching center 18 makes the channel selection. Continuing with the prior example, assume cell 10(4) is the selected target cell for hand-off, an idle one of the voice channels carried by the assigned voice frequencies f11, f18 and f25 for cell 10(4) is selected by the system for call hand-off. Once the voice channel selection is made, a message is sent to the mobile station 16 to switch to the selected one of the voice channels for the voice frequencies in cell 10(4) and the call is simultaneously rerouted by the mobile switching center from the base station in cell 10(3) to the base station 14 for cell 10(4) to effectuate the hand-off.

Typically, the selection by the system of one of the idle voice channels in a cell 10 for call hand-off or during call set-up is made either randomly or in accordance with a stored FIFO voice channel queue. No consideration is given as to whether the selected voice channel is the best (i.e., least interfered or highest quality) available channel. This selection method ignores the communications problems discussed herein that are caused by injected interference.

For use in a cellular system having voice frequencies supporting analog voice channels, the signal strength measurement device 23 in the base station 14 comprises a signal strength receiver (SSR) 24 that includes a receiver and frequency synthesizer for selectively tuning to any one of the radio frequencies available in the cellular band. This would include not only the radio frequencies (voice and control) assigned to and used by other cells, but also the radio frequencies assigned to and used by the cell served by the base station 14. Accordingly, in the example shown in FIG. 1, the signal strength receiver 24 of each base station 14 would be selectively tunable to any of the radio frequencies f1–f28 used by the system. In particular, with respect to the base station in cell 10(4), the signal strength receiver 24 tunes to and makes signal strength measurements on any of the voice frequencies comprising the analog voice channels, including, for example, the frequencies f11, f18 and f25 assigned to the cell served by base station 10(4).

In accordance with the present invention, the operation of the signal strength receiver 24 of each base station 14 is controlled in an additional operating mode by received mobile switching center commands and/or the base station programming to measure the signal strength of communications on each of the voice frequencies comprising idle analog voice channels assigned to the base station. These measurements are made at selected times or are made periodically in accordance with system specifications. The results of the measurements provide an indication of the amount of injected interference caused by same or adjacent voice channel communications occurring simultaneously within the system, or caused by any other interference source. The idle analog voice channel signal strength measurements are reported by the signal strength receiver 24 of the base station 14 to the mobile switching center 18 (perhaps along with the hand-over voice channel signal strength measurements made on the voice frequencies/channels assigned to other cells) and considered in connection with the selection of a voice channel for either call set-up or hand-off. By giving the signal strength receiver 24 the additional task of measuring on its own voice channels, the present invention advantageously utilizes the existing base station hardware to effectuate a quality driven voice channel selection procedure.

In a digital cellular telephone system, each of the radio frequencies assigned for digital TDMA use is further subdivided into a plurality of time slots comprising the digital voice channels. Through use of known time division multiple access (TDMA) communications protocols, plural communications links between base stations and mobile stations may accordingly be established on each of the voice frequencies to further expand the communications capacity of the system. The signal strength measurement device 23 in a digital system accordingly comprises a locating verification module (LVM) 30 including a receiver and frequency synthesizer for selectively tuning to any one of the radio frequencies available in the cellular band including the radio frequencies (voice and control) assigned to and used by the cell served by the base station 14. To account for the presence of multiple time slots per frequency, the locating verification module 30 still further includes a circuit for synchronizing operation of the module to the TDMA communications protocol being implemented by the digital cellular communications system so that the signal strength measurements on a selected voice frequency are made during each of the plurality of included time slots comprising the digital voice channels.

In accordance with the present invention, the operation of the locating verification module 30 of each base station 14 is controlled in an additional operating mode by mobile switching center commands or programming to measure the signal strength of communications on each idle time slot (i.e., digital voice channel) of the voice frequencies assigned to the base station. These measurements are made at selected times or are made periodically in accordance with system specifications. The results of the measurements provide an indication of the amount of injected interference caused by same voice channel (time slot) communications occurring simultaneously on the same or adjacent voice frequencies of the system. The measurements further detect other types of injected interference as well. The idle digital voice channel signal strength measurements are reported by the locating verification module 30 of the base station 14 to the mobile switching center 18 (perhaps along with the hand-over voice channel signal strength measurements made on the time slots of the voice frequencies assigned to other cells) and considered in connection with the selection of a voice channel (time slot) for either call set-up or hand-off. By giving the locating verification module 30 the additional task of measuring on its own voice channels, the present invention advantageously utilizes the existing base station hardware to effectuate a quality driven voice channel selection procedure.

It should be understood that the analog signal strength receiver 24 may be used to make signal strength measurements on TDMA digital voice frequencies if needed. However, such is not necessarily recommended for typical operation due to the fact that the measurement cannot be guaranteed to be made during an idle time slot thus preventing the accurate measurement of injected interference on the voice channels. One solution to this problem would be to make the measurement multiple times, with the averaged signal strength being an estimate of the injected interference. This estimation is, however, less accurate than would be obtained from the locating verification module 30 itself. It should also be understood that one piece of equipment could be provided in the base station to make analog and digital voice channel measurements (i.e., a combined signal strength receiver 24 and locating verification module 30).

Reference is now made to FIG. 3A wherein there is shown a flow diagram illustrating one manner of operation of the present invention in connection with a cellular telephone system. In step 100, at a designated point in time the mobile switching center of the cellular telephone system generates a message commanding certain ones of the base stations to make idle voice channel signal strength measurements. This command message is sent to the designated base stations in step 102. At each of the receiving base stations, the command message is implemented in step 104 by configuring the signal strength measurement device of the base station to tune to the base station's assigned voice frequencies and make signal strength measurements on the idle voice channels (analog and/or digital) that have been assigned to the cell served by the particular measuring base station. It should be understood that this is an operating mode in addition to the conventional operating mode of making measurements on neighboring cell voice channels in response to a hand-off request and the determination of a target cell.

With respect to analog voice frequencies, the signal strength measurement device used comprises the analog signal strength receiver of the base station. With respect to digital TDMA voice frequencies, on the other hand, the signal strength measurement device comprises the digital locating verification module. It will, of course be understood that one base station may include both an analog signal strength receiver and a digital locating verification module (perhaps as one integrated device) when the cellular telephone system includes both digital and analog radio frequencies.

The results of the signal strength measurements on either or both the analog and/or digital voice channels are reported by the signal strength measurement device back to the mobile switching center in step 106. In response to the reported measurements, the system evaluates the measurements in step 108 in accordance with a voice channel selection algorithm to select one of the idle voice channels for carrying the cellular call. The selection algorithm may be as simple as selecting the voice channel having the highest quality. Alternatively, the selection algorithm may evaluate other cellular communications factors, along with the measured injected interference, in making the voice channel selection.

Referring now to FIG. 3B, there is shown a flow diagram illustrating an alternative method of operation in accordance with the present invention wherein loop 110 and step 112 concern the programming of the base station to periodically measure signal strength on idle voice channels that have been assigned to the cell served by the particular measuring base station. At step 114 in loop 110, the base station programming tests for the occurrence of a reporting event. By this it is meant some cellular system event in response to which the measurements are to be reported to the mobile switching center. One such event comprises receipt of a command from the mobile switching center specifying the transmittal of the latest measurements. Another such event comprises receipt of a command from the mobile switching center directing the signal strength measuring device to make measurement on the voice channels of other neighboring cells in preparation for hand-off and the selection of a target cell. In that case, the measurements relating to the own voice channels are appended to the message reporting on the measurements made of the voice channels for the neighboring cells. Yet another such event comprises a time out occurrence, thus effectuating periodic reporting of the voice channel signal strength measurement information. Once the reporting event occurs, the measurements are reported in step 116 to the mobile switching center. In response to the reported measurements, the system evaluates the measurements in step 118 in accordance with a voice channel selection algorithm to select one of the idle voice channels for carrying the cellular call.

Figure 4:
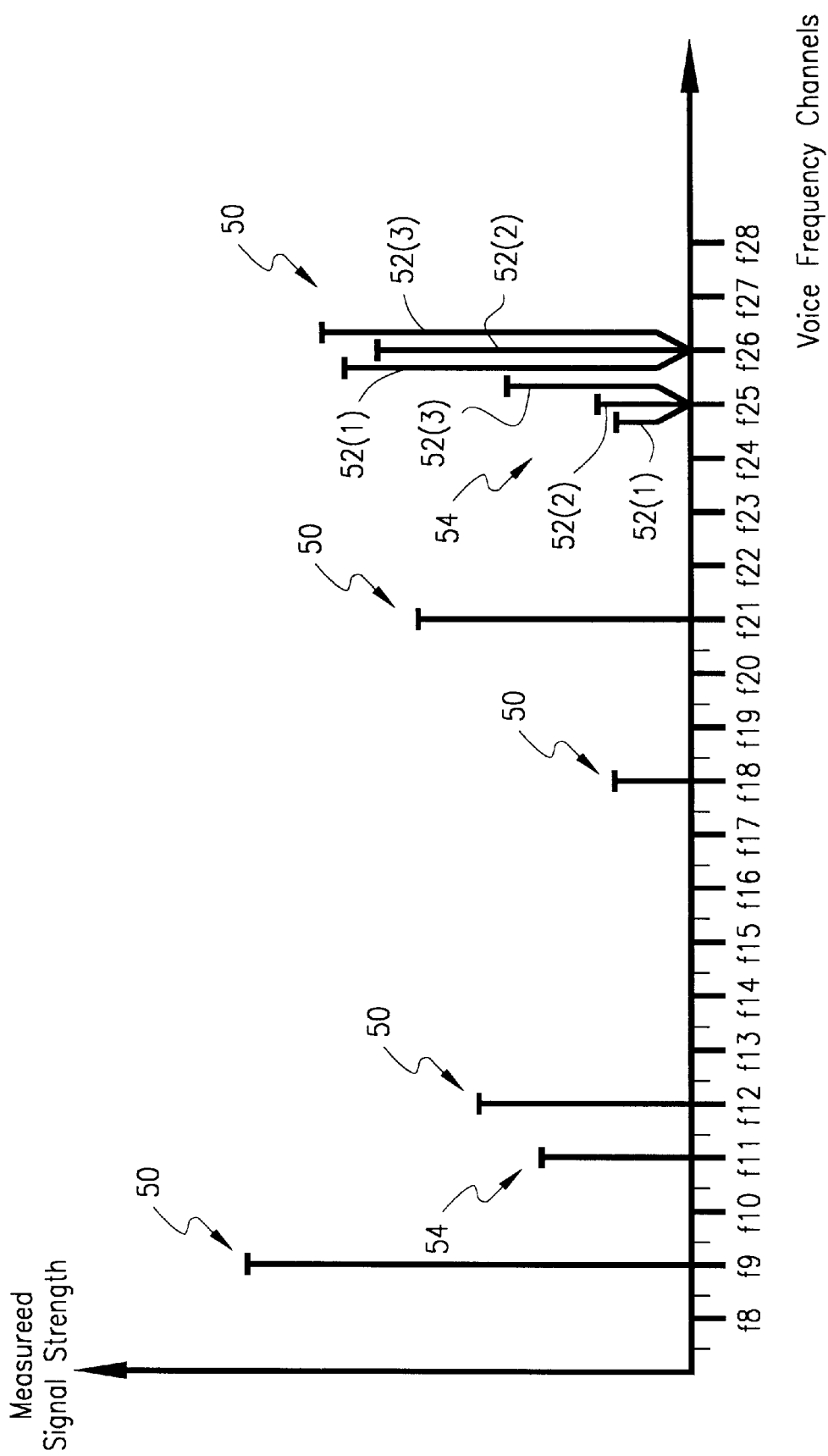
FIG. 4 is a graph illustrating the results of one instance of a signal strength measurement operation made by a base station in accordance with the present invention.

Operation of the present invention may be better understood with reference to FIG. 4 wherein there is shown a graph illustrating one instance of measured signal strength made in accordance with the present invention by the base station 14 in cell 10(4). Signal strength in decibels is represented on the y-axis of the graph, while the twenty-one voice frequencies f8–f28 in the cellular system of FIG. 1 are identified on the x-axis. Cell 10(4) in each cluster for the exemplary system illustrated in FIG. 1 is assigned radio frequencies f11, f18 and f25 for its own analog and/or digital voice frequencies while the remaining frequencies are assigned in the manner described above to the other cells 10 in the cluster 12.

In accordance with the conventional operating mode in assisting with hand-off and the identification of a target cell for hand-off, the mobile switching center instructs the base stations 14 in neighboring cells 10 to use their signal strength measuring devices 23 (comprising either or both the analog signal strength receiver 24 and/or the digital locating verification module 30) to make a signal strength measurement on one or more of the voice channels assigned to other cells 10 in the cluster 12. For example, with the base station in cell 10(4), measurement could be ordered for assisting in target cell determination on the particular ones of the voice frequencies f8–f10, f12–f17, f19–f24 and f26–f28 with respect to certain voice channels currently in use by mobile stations that are potentially in need of hand-off. The results of one instance of such signal strength measurements are illustrated at 50 in FIG. 4 with respect to base station 14 in cell 10(4) and mobile switching center 18 identified hand-offs for mobile station communications on voice frequencies f9 (for an analog cellular communication occurring on a voice channel in cell 10(2)), f12 and f26 (for analog and digital cellular communications, respectively, occurring on voice channels in cell 10(5)), and f21 (for an analog cellular communication occurring on a voice channel in cell 10(7)). From these measurements 50 it is noted that the conversations on voice frequency f9 and on each of the time slots (digital voice channels) 52(1)–52(3) of voice frequency f26 have a high relative measured signal strength indicative of a close mobile station and are accordingly good candidates for hand-off with cell 10(4) being a potential target cell. Conversely, the measured signal strength on the analog voice channels of frequencies f12 and f21 are relatively low indicating that these conversations are occurring with mobile stations located further away from cell 10(4), in which case cell 10(4) is unlikely to be chosen as the target cell.

Continuing with this example, in accordance with the additional base station operating mode of the present invention, the signal strength measurement capabilities of the signal strength receiver 24 comprising the signal strength measuring device 23 of the base station 14 in cell 10(4) are advantageously used to also make signal strength measurements on each of the idle voice frequencies f11 and f18 for the analog voice channels assigned to cell 10(4). Furthermore, assuming for this example that voice frequency f25 of cell 10(4) is a digital TDMA channel, signal strength measurements are made by the locating verification module 30 of the signal strength measuring device 23 in each of the three idle time slots 52(1)–52(3) of voice frequency channel f25 for the digital voice channels assigned to cell 10(4). The results of these measurements, which are related to the injected interference caused by concurrent voice conversations on those or perhaps adjacent voice channels in the system, or perhaps due to other interference sources, are shown at 54 in FIG. 4. From these measurements 54, it is noted that the injected interference on the analog voice channel for voice frequency f11 and the digital voice channel of the third time slot 52(3) of voice frequency f25 are relatively high, especially in relation to the measurements 50 made on the voice frequencies of other cells during target cell determination. This would indicate that these voice channels would not be preferred for selection at call set-up or hand-off. The analog voice channel comprising voice frequency f18 and digital voice channels of time slots one and two 52(1) and 52(2) of voice frequency f25, on the other hand, have very little injected interference, and accordingly would comprise preferred choices to be selected at call set-up or hand-off.

The measurements illustrated in FIG. 4 made by the signal strength measuring device 23 concerning the analog and digital voice channels for the voice frequencies f11, f18 and f25 are reported to the mobile switching center and processed in accordance with a selection algorithm to select a voice channel based on quality driven selection procedure for carrying a call in response to either a call set-up or hand-off.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A base station for use in a cellular telephone system having a plurality of voice channels available for carrying cellular communications, comprising:
    a plurality of voice channel transceivers for effectuating radio frequency communications with mobile stations over an assigned subset of the plurality of voice channels; and
    a signal strength measuring device, separate from the plurality of voice channel transceivers, selectively tunable to make uplink signal strength measurements on any of the plurality of voice channels, and having a first mode of operation to tune to and make uplink signal strength measurements on selected ones of the plurality of voice channels other than in the subset of voice channels, and having a second mode of operation to tune to and make uplink signal strength measurements and measure injected interference on idle ones of the subset of voice channels assigned to the base station.

2. The base station as in claim 1 wherein the signal strength measuring device comprises a base station analog signal strength receiver and each voice channel comprises an analog cellular voice frequency.

3. The base station as in claim 1 wherein the uplink signal strength measurements made in the first mode of operation are processed to identify whether the base station comprises a target base station for cellular communications hand-off.

4. The base station as in claim 1 wherein the uplink signal strength measurements made in the second mode of operation are system process in making a selection of one of the subset of voice channels provided by the plurality of voice channel transceivers of the base station to carry a cellular communication.

5. The base station as in claim 1 wherein the injected interference measured in the second mode comprises co-channel interference due to reuse of the plurality of voice channels.

6. The base station as in claim 1 wherein the signal strength measuring device comprises a base station digital locating verification module and each voice channel comprises a time slot within a time division multiple access (TDMA) digital cellular voice frequency.

7. The base station as in claim 6 wherein the locating verification module makes uplink signal strength measurements on idle ones of the time slots.

8. In a cellular telephone system having a plurality of voice channels, a method for system operation wherein each base station in the system is assigned for cellular communications to a subset of the plurality of voice channels, the method comprising the steps of:
    making uplink signal strength measurements by a signal strength measuring device of a base station on selected ones of the plurality of voice channels other than in the subset of voice channels assigned to that base station, wherein the signal strength measuring device is separate from any transceivers for the voice channels;
    processing the uplink signal strength measurements made on the selected ones of the plurality of voice channels in identifying instances where the base station comprises a target base station for cellular communication hand-off;
    making uplink signal strength measurements by the signal strength measuring device on idle ones of the subset of voice channels assigned to the base station to detect instances of injected interference; and
    processing the measurements of injected interference in selecting one of the idle ones of the subset of voice channels for carrying a cellular communication.

9. The method of claim 8 wherein the injected interference comprises co-channel interference due to reuse of the subsets of voice channel by other base stations in the cellular telephone system.

10. The method as in claim 8 further including the step of reporting uplink signal strength measurements by appending the uplink signal strength measurements on the subset of voice channels concerning injected interference to the uplink signal strength measurements made on the selected ones of the plurality of voice channels other than in the subset of voice channels.

11. The method as in claim 8 wherein the voice channels comprise time slots within digital time division multiple access (TDMA) voice frequency channels, and wherein the step of making uplink signal strength measurements on idle ones of the subset of voice channels comprises the step of making uplink signal strength measurements during idle time slots within the subset of voice channels.

12. The method as in claim 11 wherein the step of processing the measurements of injected interference comprises the step of processing the injected interference in each idle time slot in selecting one of the idle time slots for carrying the cellular communication.

13. A method for operating a base station in a cellular telephone system utilizing a plurality of voice channels including a subset of voice channels thereof assigned to the base station, comprising the steps of:
    making uplink signal strength measurements on idle ones of the subset of the plurality of voice channels to detect instances of injected interference, the idle voice channel uplink signal strength measurements processed in making a quality driven selection by the system of one of the subset of voice channels to handle a cellular voice communication; and
    making uplink signal strength measurements on selected ones of the plurality of voice channels other than in the subset of voice channels, the selected voice channel uplink signal strength measurements processed in identifying by the system whether the base station comprises a target base station for cellular voice communication hand-off;
    wherein the uplink signal strength measurements are made by a signal strength measurement device of the base station, the unlink signal strength measurement device being separate from any transceivers for the voice channels.

14. The method of claim 13 wherein the step of making the idle voice channel uplink signal strength measurements is performed in response to a system request for the making of the selected uplink voice channel signal strength measurements.

15. The method as in claim 13 wherein the plurality of voice channels include analog voice channels comprising analog voice frequencies.

16. The method as in claim 13 wherein the plurality of voice channels include digital TDMA voice channels comprising time slots within digital voice frequencies.

17. The method as in claim 13 wherein the injected interference comprises co-channel interference due to reuse of the subset of voice channels by other base stations.

18. The method as in claim 13 further comprising the step of reporting the idle voice channel uplink signal strength measurements for processing to select one of the subset of voice channels to handle the cellular voice communication.

19. The method as in claim 18 further comprising the step of reporting the selected voice channel uplink signal strength measurements for processing to identify whether the base station comprises the target base station for cellular voice communication hand-off.

20. The method as in claim 19 wherein the step of reporting the idle voice channel uplink signal strength measurements comprises the step of appending the idle voice channel uplink signal strength measurements to the report on the selected voice channel uplink signal strength measurements.

21. A cellular telephone system having a plurality of voice channels available for carrying cellular communications, comprising:

a plurality of base stations distributed across a service area, each base station being assigned to use a subset of the plurality of voice channels wherein each base station includes:

a plurality of voice channel transceivers tuned to the subset of the voice channels assigned to that base station; and an uplink signal strength measuring device, separate from the voice channel transceivers, selectively tunable for making uplink signal strength measurements on any of the plurality of voice channels in the system; and a mobile switching center connected to each of the plurality of base stations to receive:

a first report from a given base station of measurements made by the uplink signal strength measuring device on selected ones of the plurality of voice channels other than in the subset of voice channels assigned to that given base station, the measured uplink signal strengths processed by the system to identify whether the given reporting base station comprises a target base station for hand-off; and a second report from the given base station of measurements made by the uplink signal strength measuring device on idle ones of the subset of the voice channels assigned to that given base station, the measured uplink signal strengths indicative of injected interference and processed by the system to select one of the idle voice channels of the given base station to carry a cellular communication.

22. The system of claim 21 wherein the uplink signal strength measuring device comprises a signal strength receiver for making uplink measurements on analog voice channels.

23. The system of claim 21 wherein the uplink signal strength measuring device comprises a locating verification module for making uplink measurements on digital voice channels.

24. The system of claim 21 wherein the second report is appended to the first report.

25. The system of claim 21 wherein the injected interference comprises co-channel interference due to reuse of each of the subsets of voice channels by at least one other base station located in a distant part of the service area.

* * * * *

UNITED STATES PATENT AND TRADEMARK OFFICE
CERTIFICATE OF CORRECTION

PATENT NO. : 6,006,092　　　　　　　　　　　　　　　　　　　　　　Page 1 of 1
DATED : December 21, 1999
INVENTOR(S) : Ward It is certified that error appears in the above-identified patent and that said Letters Patent is hereby corrected as shown below:

Column 12,
Line 24, replace "channel" with -- channels --.
Line 65, replace "unlink" with -- uplink --.

Signed and Sealed this

Twenty-seventh Day of November, 2001

Attest:

*Nicholas P. Godici*

NICHOLAS P. GODICI
*Attesting Officer*　　*Acting Director of the United States Patent and Trademark Office*